US012725901B2

(12) United States Patent
Takeda

(10) Patent No.: US 12,725,901 B2
(45) Date of Patent: Sep. 1, 2026

(54) WAVEGUIDE CONVERTER

(71) Applicant: Asahi Kasei Microdevices Corporation, Tokyo (JP)

(72) Inventor: Yohsuke Takeda, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 40 days.

(21) Appl. No.: 19/019,648

(22) Filed: Jan. 14, 2025

(65) Prior Publication Data

US 2025/0293421 A1 Sep. 18, 2025

(30) Foreign Application Priority Data

Mar. 18, 2024 (JP) ................................ 2024-041995

(51) Int. Cl.
*H01P 5/107* (2006.01)
*H01P 3/12* (2006.01)
*H01P 5/08* (2006.01)

(52) U.S. Cl.
CPC .................. *H01P 5/08* (2013.01); *H01P 3/12* (2013.01); *H01P 5/107* (2013.01)

(58) Field of Classification Search
CPC .. H01P 5/107; H01P 5/08; H01P 5/085; H01P 5/087; H01P 5/10; H01P 5/1022; H01P 3/12; H01P 1/16
USPC ...................................................... 333/26, 25
See application file for complete search history.

(56) References Cited

U.S. PATENT DOCUMENTS

| | | | | |
|---|---|---|---|---|
| 7,132,905 | B2 | 11/2006 | Sano | |
| 7,680,464 | B2 | 3/2010 | Pleva | |
| 2003/0076188 | A1 | 4/2003 | Dawn | |
| 2007/0182505 | A1 | 8/2007 | Fujita | |
| 2008/0266196 | A1 | 10/2008 | Shi | |
| 2011/0050356 | A1 | 3/2011 | Nakamura | |
| 2012/0162015 | A1 | 6/2012 | Chen | |
| 2013/0214871 | A1 | 8/2013 | Nakamura | |
| 2019/0020089 | A1 * | 1/2019 | Yatabe | H01P 1/213 |
| 2019/0207286 | A1 | 7/2019 | Moallem | |

FOREIGN PATENT DOCUMENTS

| | | | |
|---|---|---|---|
| CN | 105680133 | A | 6/2016 |
| CN | 107154524 | A | 9/2017 |
| DE | 102006019054 | A1 | 10/2007 |
| JP | H08162810 | A | 6/1996 |
| JP | H11261308 | A | 9/1999 |
| JP | 2000244212 | A | 9/2000 |

(Continued)

*Primary Examiner* — Stephen E. Jones

(57) ABSTRACT

A plurality of pairs of ground vias which are arranged, in a planar view, facing each other on opposite sides of the slit may include, in a direction that the slit extends in a planar view from a center of the second opening, at least one pair of first ground vias, which are positioned within a first distance range, and at least one pair of second ground vias, which are positioned within a second distance range. A minimum distance between via-walls of the at least one pair of first ground vias may be wider than a minimum distance between via-walls of the at least one pair of second ground vias. A signal at a first frequency band may be transmitted through the transmission line at a first resonating mode, and a signal at a second frequency band may be transmitted through the transmission line at a second resonating mode.

14 Claims, 12 Drawing Sheets

10

20

(56) References Cited

FOREIGN PATENT DOCUMENTS

| | | | |
|---|---|---|---|
| JP | 2004320460 | A | 11/2004 |
| JP | 2005286435 | A | 10/2005 |
| JP | 2011061290 | A | 3/2011 |
| JP | 2011109431 | A | 6/2011 |
| JP | 2011120155 | A | 6/2011 |
| JP | 2020145603 | A | 9/2020 |
| WO | 2022055411 | A1 | 3/2022 |

* cited by examiner

10

At $f_0$, TM01 MODE

At 1.05 $f_0$, HIGHER ORDER MODE

WAVEGUIDE CONVERTER

The contents of the following patent application(s) are incorporated herein by reference: NO. 2024-041995 filed in JP on Mar. 18, 2024.

BACKGROUND

1. Technical Field

The present invention relates to a waveguide converter.

2. Related Art

Patent Document 1 discloses a waveguide converter which includes a waveguide, a patch conductor, a ground conductor, and a port portion. Patent Document 2 discloses that a conductor patch included in a waveguide converter has a protuberance on each of shorter sides near both ends of a longer side. Patent Document 3 discloses a short-circuit metal layer includes a notch for arranging a strip line, and the short-circuit metal layer and the strip line are arranged at a regular interval on a dielectric substrate.

PRIOR ART DOCUMENTS

Patent Document

Patent Document 1: Japanese Patent Application Publication No. 2011-055377
Patent Document 2: Japanese Patent Application Publication No. 2013-172251
Patent Document 3: Japanese Patent Application Publication No. 2000-244212

DESCRIPTION OF EXEMPLARY EMBODIMENTS

Figure 1:
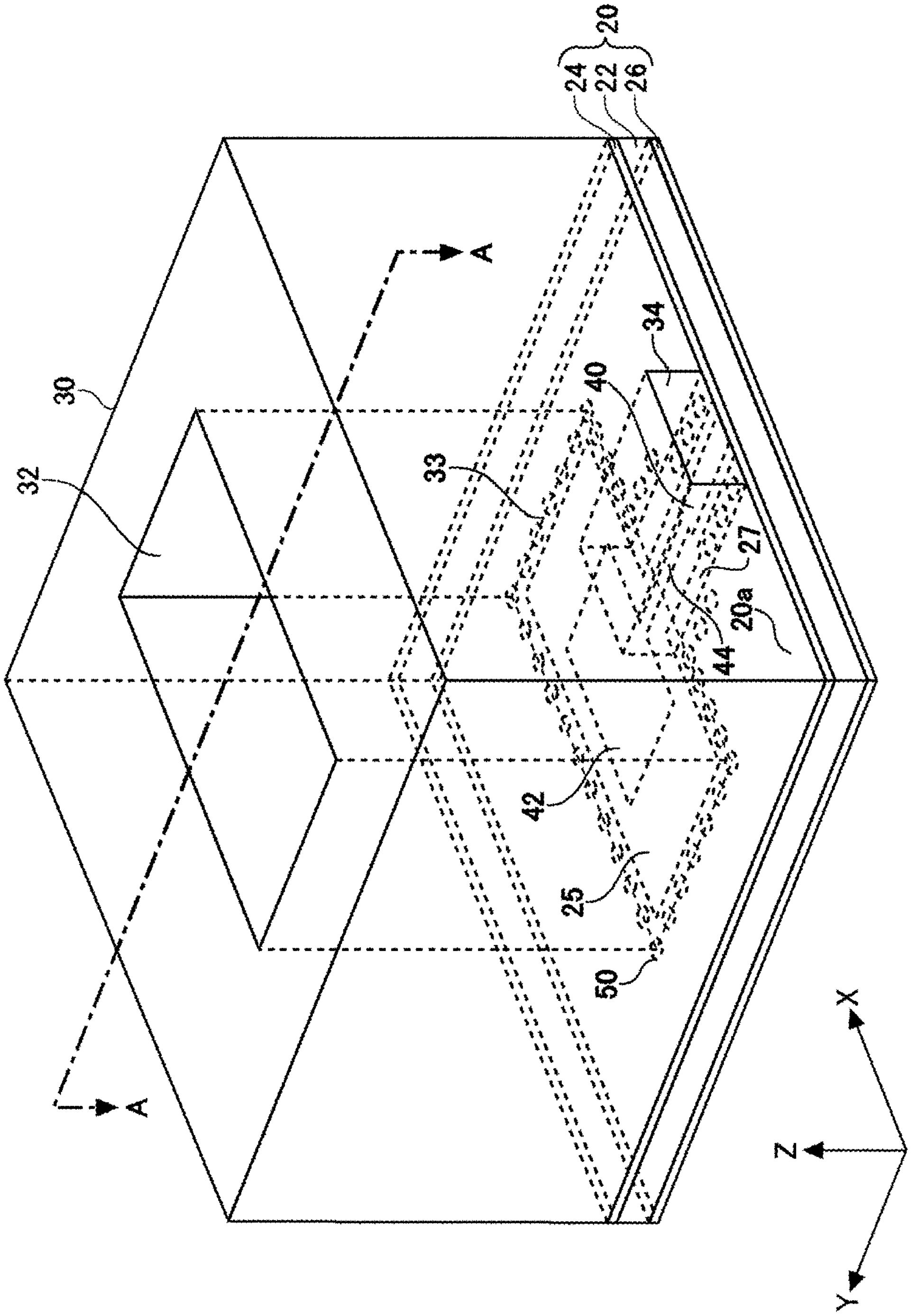
FIG. 1 illustrates an exemplary perspective view of an appearance of a waveguide converter according to a first embodiment.

The present invention will be described below through embodiments of the invention, but the following embodiments do not limit the invention according to the claims. In addition, not all of the combinations of features described in the embodiments are essential to the solution of the invention.

In a device or the like that includes a transceiver circuit and an antenna for high frequencies such as a millimeter waveband, which is used for automotive radar or wireless communication or the like, reduction in wiring loss or a size of the device can be intended by interposing a waveguide into a connection portion between the transmission/reception circuit and the antenna. As a connection portion like this, a waveguide converter may be used, which converts bilaterally between electrical power which is transmitted through the waveguide, and electrical power which is transmitted through a transmission line on a substrate.

For example, for a waveguide converter like this, Patent Document 1 discloses a basic structure in a configuration where a waveguide is connected to from a surface on a signal line side of a microstripline on a substrate. Patent Document 2 discloses that frequency characteristics are improved by adding protuberances to a patch portion. Patent Document 3 discloses a structure that intends a wider bandwidth by connecting to a waveguide from a surface side of a ground conductor constituting a microstripline on a substrate.

While a waveguide converter described in Patent Document 1 has a simple configuration and is low-profile, its frequency band is narrow in principle because it has one resonating point, and it is difficult to achieve frequency characteristics with a wide bandwidth equal to 5% or more, as is required for millimeter-wave radar in recent years.

A waveguide converter described in Patent Document 2 intends, in the structure described in Patent Document 1, to improve the frequency characteristics by adding the protuberance on both sides of the conductor patch. However, an effect of the improvement is limited and it entails high cost because it requires highly precise patterning to add the tiny protuberances to the conductor patch.

A waveguide converter described in Patent Document 3 can achieve frequency characteristics with a wide bandwidth by adding a short-circuit waveguide portion whose length is a quarter of a wavelength. However, lowering its profile is difficult because a height of the short-circuit waveguide portion is about 1-2 mm. In addition, it is not for mass production because there would be large variations due to processing accuracy of the short-circuit waveguide portion. Also, because the waveguide is positioned on a side opposite to a signal line surface of a transmission line, it is required, when using a multi-layered substrate, to use an expensive substrate material with low permittivity and low dielectric loss tangent in all layers, and thus this is a high-cost configuration.

A waveguide converter according to the present embodiment achieves frequency characteristics with a wide bandwidth while suppressing the height of the waveguide.

Figure 2:
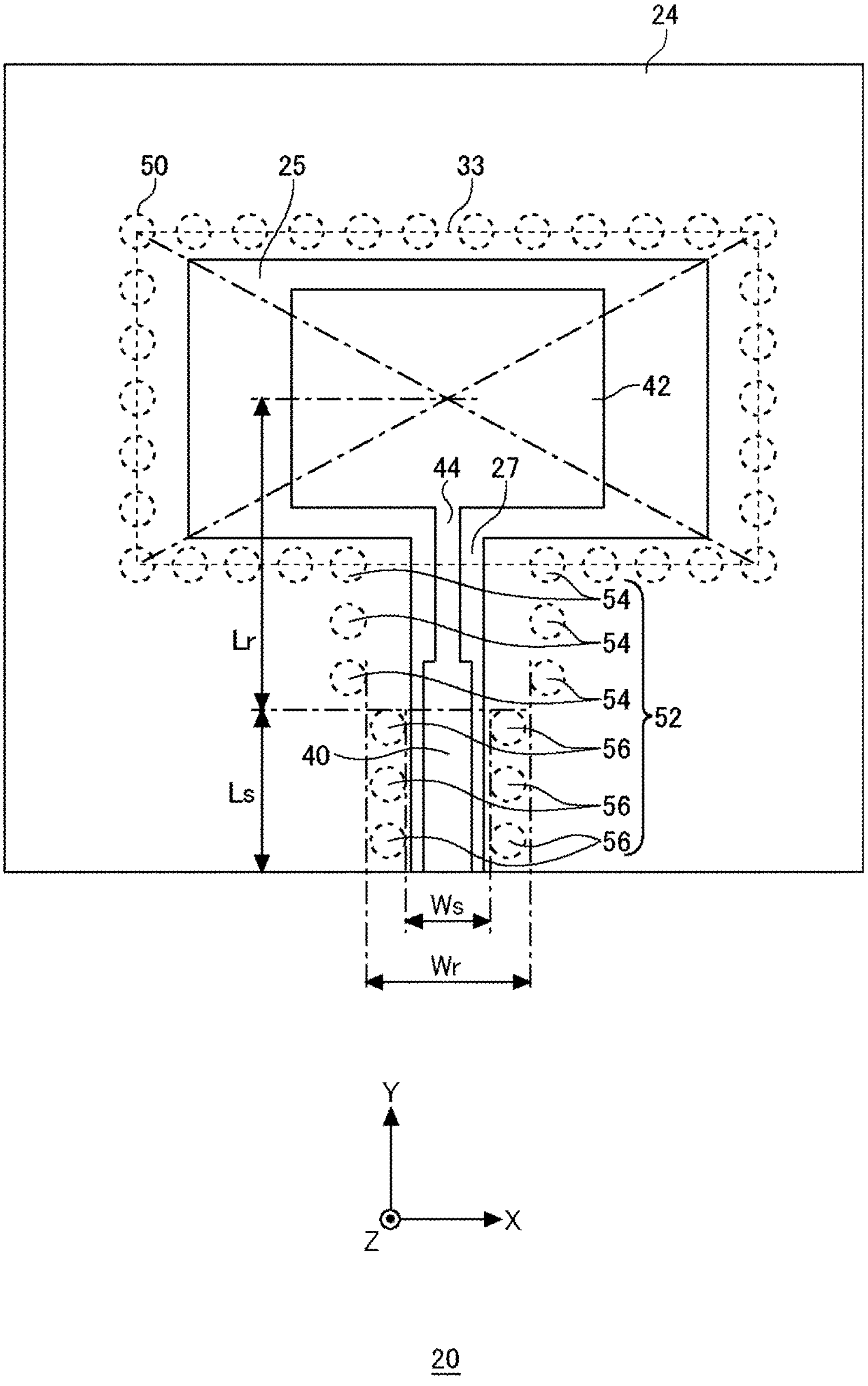
FIG. 2 illustrates a plan view of a substrate included in the waveguide converter according to the first embodiment seen from a first ground conductor layer side.
Figure 3:
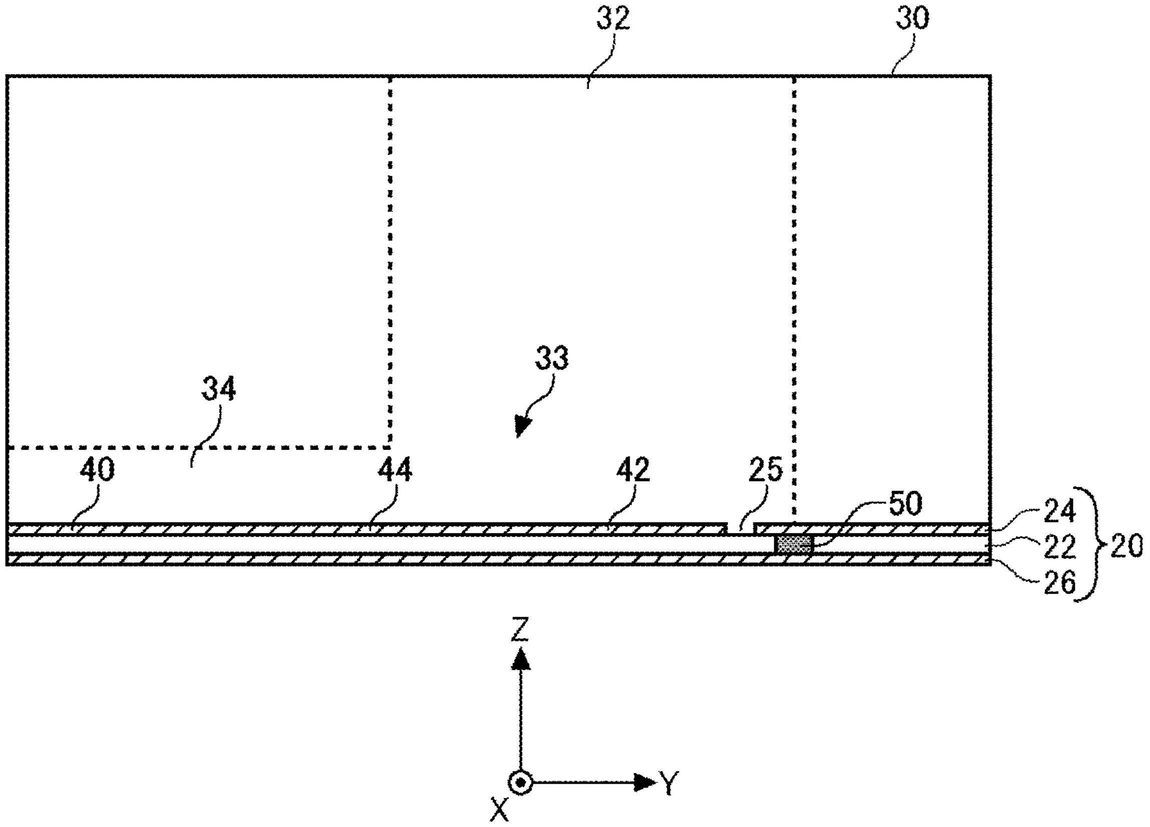
FIG. 3 illustrates an A-A line sectional view of FIG. 1.

FIG. 1 illustrates an exemplary perspective view of an appearance of a waveguide converter 10 according to a first embodiment. FIG. 2 illustrates a plan view of a substrate 20 included in the waveguide converter 10 seen from a first ground conductor layer 24 side. FIG. 3 illustrates an A-A line sectional view of FIG. 1. In FIG. 1, the X axis is a direction along a longer side of a conductor patch 42, the Y axis is a direction along a shorter side of the conductor patch 42, and the Z axis is a direction in which a cavity portion 32 of a waveguide 30 extends. The same applies to other drawings.

The waveguide converter 10 includes the substrate 20 and the waveguide 30. The waveguide 30 is arranged on a first surface 20*a* side of the substrate 20. The waveguide 30 includes the cavity portion 32 which is in a rectangular column shape surrounded by a conductor wall. The cavity portion 32 extends in a direction intersecting with the first surface 20*a*. The cavity portion 32 may extend in the Z-axis direction perpendicular to the first surface 20*a*. The waveguide 30 includes a first opening 33 at one end of the cavity portion 32. The first opening 33 is formed of a cross-section of the cavity portion 32 in a direction orthogonal to a direction of signal transmission. At another end of the cavity portion 32, an antenna which emits and receives a signal at high frequencies such as microwave or millimeter-wave may be connected.

The waveguide 30 may be comprised of aluminum alloy. The waveguide 30 may be another type of conductor for a waveguide, such as a member that is gold-plated brass, or conductor-plated resin. A cross-sectional shape of the cavity portion 32 of the waveguide 30, i.e., a shape of the first opening 33 may be a rectangular shape, such as a square or a rectangle. For example, the first opening 33 may, for the 79 GHz band, have a longer side of 3.099 mm×a shorter side of 1.549 mm, which is the WG-12 standard, or the like.

The substrate 20 includes a dielectric layer 22, a first ground conductor layer 24, and a second ground conductor layer 26. The first ground conductor layer 24 is arranged on a waveguide 30 side of the dielectric layer 22 and includes a second opening 25 which faces the first opening 33 of the waveguide 30, and a slit 27 extending from the second opening 25 along the first surface 20*a*. The slit 27 extends in a direction intersecting with a longitudinal direction of the second opening 25. The slit 27 may extend in the Y-axis direction, which is perpendicular to the X-axis direction which is the longitudinal direction of the second opening 25, and is a direction along the first surface 20*a*. The second opening 25 is in a shape along the first opening 33 of the waveguide 30, and a size of the second opening 25 may be smaller than a size of the first opening 33. A center of the first opening 33 of the waveguide 30 and a center of the second opening 25 match each other in a planar view.

The second ground conductor layer 26 is arranged on a side of the dielectric layer 22 opposite to the first ground conductor layer 24. Relative permittivity of the dielectric layer 22 may be a value from 2 to 4, and may be 3.1, for example. A thickness of the dielectric layer 22 may be 0.025 mm or more and 0.5 mm or less, for example. The substrate 20 may be comprised of an organic substrate or an inorganic substrate which includes conductor layers which are 1 μm or more and are formed of two or more layers of copper including the first ground conductor layer 24 and the second ground conductor layer 26. The substrate 20 may further include at least one third conductor layer and at least one other dielectric layer which are arranged on a side of the second ground conductor layer 26 opposite to the dielectric layer 22 and stacked alternately. In other words, the substrate 20 may be comprised of multi-layers where a conductor layer and another dielectric layer are arranged alternately, as well as the first ground conductor layer 24 and the second ground conductor layer 26.

The substrate 20 further includes a transmission line 40, the conductor patch 42, and a connection line 44. The transmission line 40 is arranged in the slit 27 and extends along the first surface 20*a* and the slit 27 without contacting the first ground conductor layer 24. The conductor patch 42 is arranged in the second opening 25 without contacting the first ground conductor layer 24. The connection line 44 is arranged in the second opening 25 and the slit 27 and along the first surface 20*a*, and connects the transmission line 40 to the conductor patch 42.

A shape of the conductor patch 42 is a rectangle or a square with a shorter side which is about a half wavelength of a wavelength of a signal transmitting through the transmission line 40 in order to set the waveguide 30 to TE01 mode. A characteristic impedance of the connection line 44 may be different from a characteristic impedance of the transmission line 40. The characteristic impedance of the connection line 44 may be a value between the characteristic impedance of the transmission line 40 and an impedance of the conductor patch 42. A width of the connection line 44 may be different from a width of the transmission line 40. The width of the connection line 44 may be narrower than the width of the transmission line 40.

Note that the connection line 44 may not be used depending on the characteristic impedance of the transmission line 40. In other words, the characteristic impedance of the connection line 44 may be the same as the characteristic impedance of the transmission line 40. In other words, the width of the connection line 44 may be the same as the width of the transmission line 40.

The first ground conductor layer 24 may be formed by cutting out a ground conductor plate along the transmission line 40, the conductor patch 42, and the connection line 44. The second ground conductor layer 26 may be comprised of a conductor with a width to sufficiently cover, in a planar view, all over the substrate 20, or the transmission line 40, the conductor patch 42, and the connection line 44.

The waveguide 30 includes a notch 34 which is communicated with the cavity portion 32, in order to avoid the transmission line 40 and the connection line 44 being electrically coupled to the waveguide 30 by the transmission line 40 and the connection line 44 contacting the waveguide 30 at a contact surface of the waveguide 30 and the substrate 20. A height of the notch 34 may be 0.5 mm or more, and a width of the notch 34 may be 0.9 mm or more. The notch 34 may be formed by cutting off a portion of the conductor wall of the waveguide 30.

The substrate 20 further includes a plurality of ground vias 50. The plurality of ground vias 50 are comprised of a conductor, and are arranged, in a planar view, along an edge of each of the second opening 25 and the slit 27, and electrically connect the first ground conductor layer 24 to the second ground conductor layer 26. The plurality of ground vias 50 are arranged to surround a portion with the same electrical potential, which is formed of the transmission line 40, the conductor patch 42, and the connection line 44.

The plurality of ground vias 50 include a plurality of pairs of ground vias 52 which are arranged, in a planar view, facing each other on opposite sides of the slit 27. The plurality of pairs of ground vias 52 include, in a direction that the slit 27 extends in a planar view from the center of the second opening 25, a plurality of pairs of first ground vias 54, which are positioned within a first distance range Lr, and a plurality of pairs of second ground vias 56, which are positioned within a second distance range Ls which is further away than the first distance range Lr. The plurality of pairs of ground vias 52 may include at least one pair of first ground vias 54 and at least one pair of second ground vias 56.

A minimum distance Wr between via-walls of the pair of first ground vias 54 is wider than a minimum distance Ws between via-walls of the pair of second ground vias 56. This configuration causes a signal at a first frequency band to be transmitted through the transmission line 40 at a first resonating mode such as TE01 mode, and a signal at a second frequency band, which is different from the first frequency band, to be transmitted through the transmission line 40 at a second resonating mode such as a higher-order mode, which is different from the first resonating mode.

The first distance range Lr may be a distance range, in the direction that the slit 27 extends in a planar view, from the center of the second opening 25 up to a greater distance than a distance corresponding to at least 0.55 wavelength relative to the wavelength of the signal transmitting through the transmission line 40. The first distance range Lr may be a distance range, in the direction that the slit 27 extends in a planar view, from the center of the second opening 25 up to a greater distance than a distance corresponding to at least 0.65 wavelength relative to the wavelength of the signal. The first distance range Lr may be a distance range, in the direction that the slit 27 extends, from the center of the second opening 25 up to a distance corresponding to at least 2 wavelength relative to the wavelength of the signal transmitting through the transmission line 40. By making the first distance range Lr the distance range up to the distance corresponding to at least 2 wavelength, saving in space of a substrate area can be achieved.

The minimum distance Wr between the via-walls of the pair of first ground vias 54 may be a distance corresponding to a wavelength from 0.5 wavelength up to 0.6 wavelength relative to the wavelength of the signal.

By arranging the pair of ground vias 54 and the pair of second ground vias 56 in the manner described above, in addition to the first resonating mode i.e. TM01 mode that is a mode in the substrate 20 excited by the conductor patch 42, the second resonating mode i.e. the higher order mode that is different from the first resonating mode i.e. TM01 mode can be formed at a different frequency band to reduce return loss and insertion loss.

For example, the minimum distance Wr between the via-walls of the pair of first ground vias 54 may be 0.57 wavelength of a wavelength of a signal on the substrate 20 e.g. 1.23 mm at a 79 GHz band. In addition, the first distance range Lr of the pair of first ground vias 54, which are arranged with the minimum distance Wr in between, from the center of the first opening 33 of the waveguide 30 in contact onto the substrate 20 i.e. the center of the second opening 25 is kept up to a distance of 0.8 wavelength of the wavelength of the signal e.g. 1.73 mm at the 79 GHz band in a direction of a shorter side of the second opening 25 or in the direction that the slit 27 extends, so that the waveguide converter 10 can be controlled to configure a resonator which forms the higher order mode.

Figure 4:
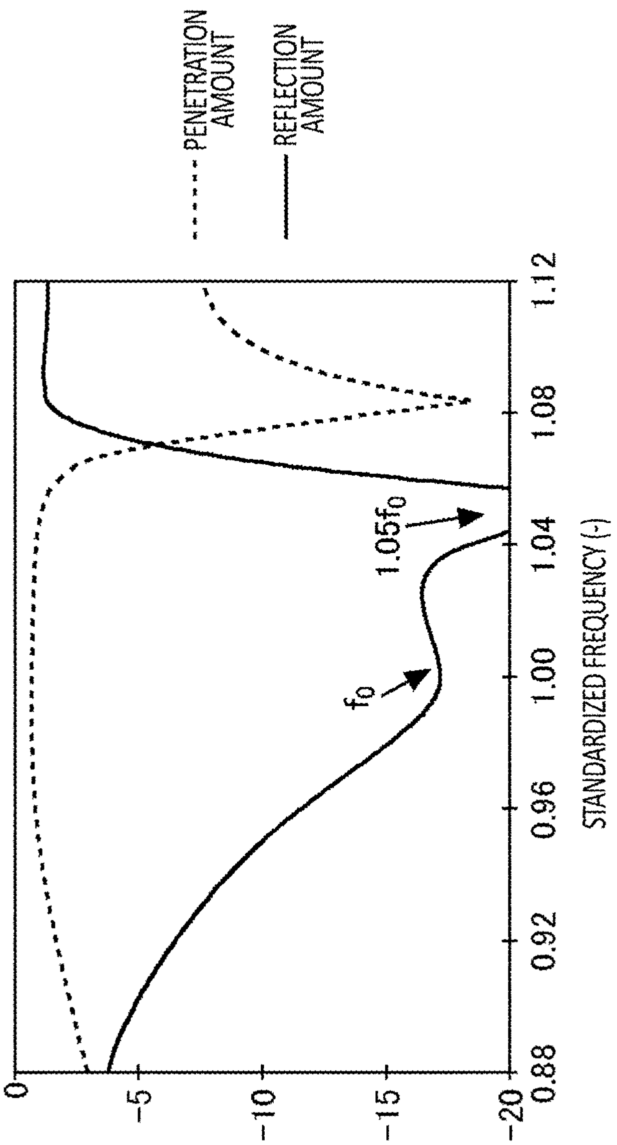
FIG. 4 illustrates a simulation result of a penetration amount and a reflection amount of the waveguide converter according to the first embodiment.
Figure 5:
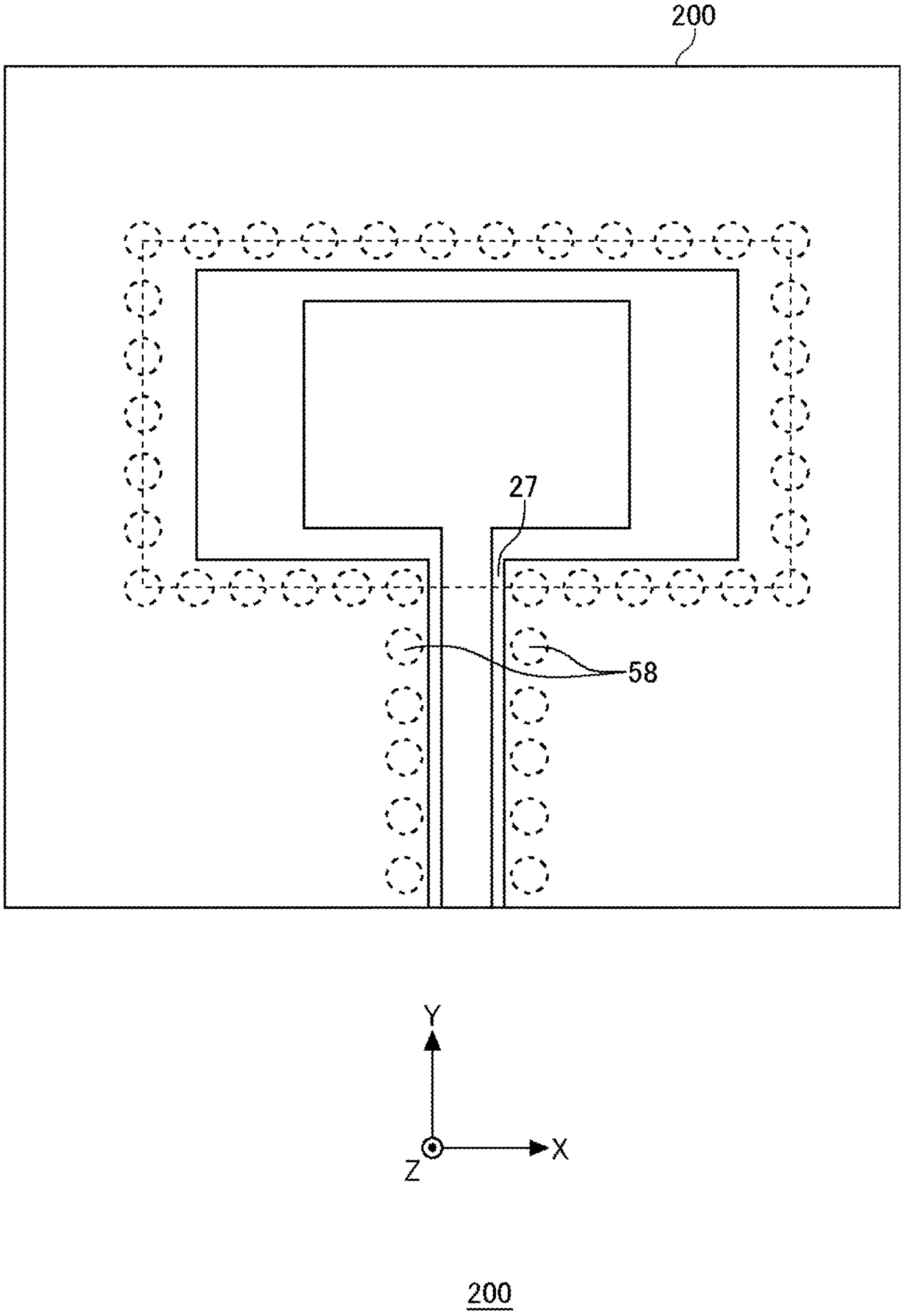
FIG. 5 illustrates a plan view of a substrate included in a waveguide converter according to a comparative example.
Figure 6:
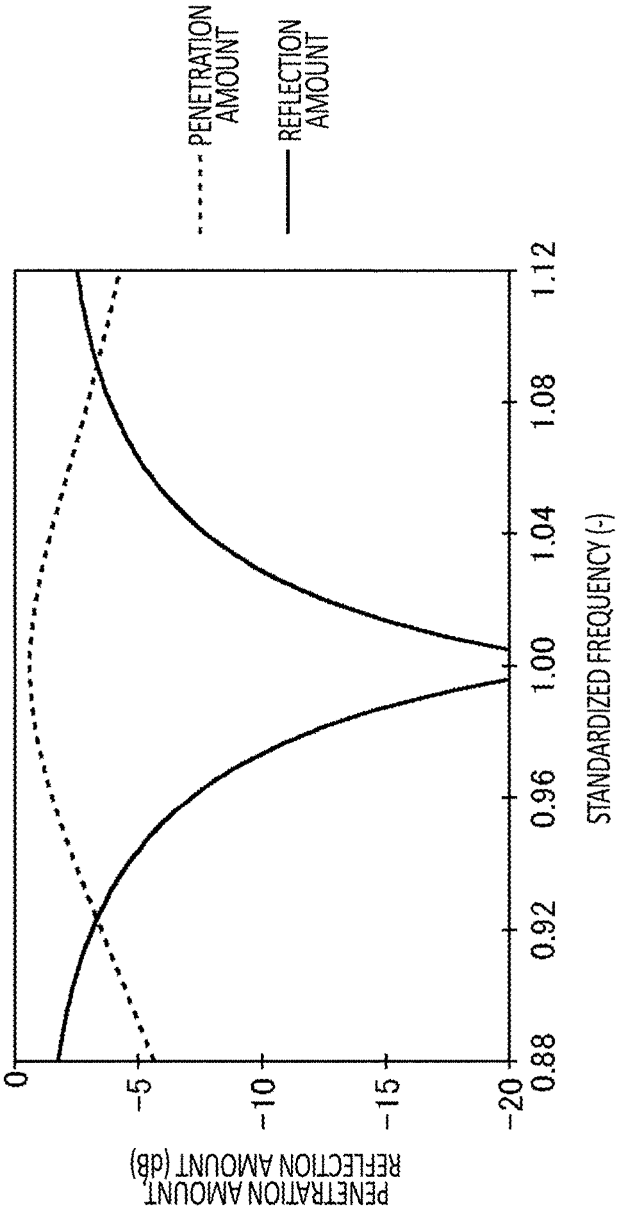
FIG. 6 illustrates a simulation result of a penetration amount and a reflection amount of the waveguide converter according to the comparative example.

FIG. 4 illustrates an example of frequency characteristics obtained by a simulation of a penetration amount and a reflection amount of the waveguide converter 10 according to the first embodiment. FIG. 5 illustrates a plan view of a substrate 200 included in a waveguide converter according to a comparative example. In the comparative example, a minimum distance between via-walls of a pair of ground vias 58 arranged facing each other on opposite sides of a slit 27 does not satisfy a condition of the waveguide converter 10 according to the first embodiment. For example, the minimum distance between the via-walls of each pair of ground vias 58 arranged facing each other on opposite sides of the slit 27 are all the same. FIG. 6 illustrates an example of frequency characteristics obtained by a simulation of a penetration amount and a reflection amount of the waveguide converter 100 according to the comparative example.

As shown in FIG. 6, while the waveguide converter 100 according to the comparative example can ensure about 2% of a 15 dB bandwidth of the reflection amount, the waveguide converter 10 according to the first embodiment can ensure 8% or more of the 15 dB bandwidth of the reflection amount. In other words, the waveguide converter 10 can achieve frequency characteristics with a wider bandwidth than the waveguide converter 100.

Figure 7:
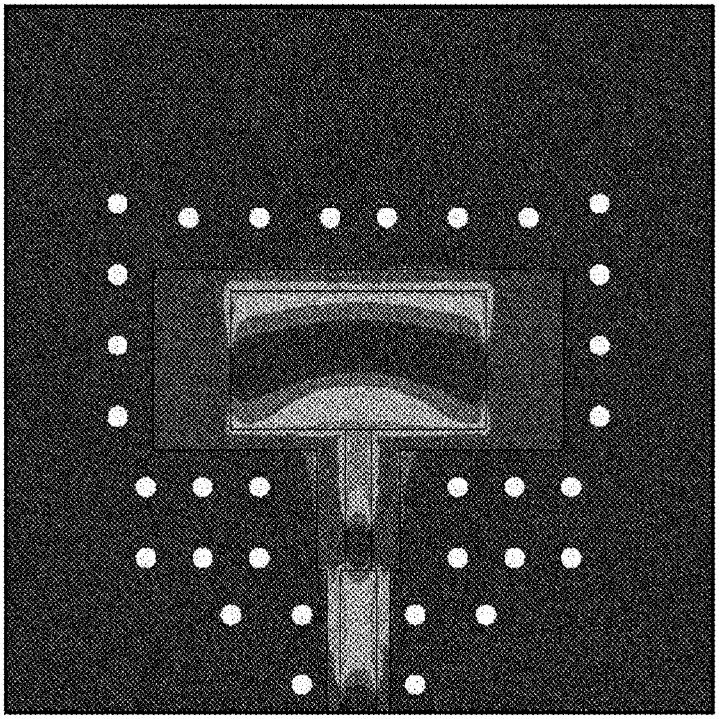
FIG. 7 illustrates an electric field distribution on the substrate at an $f_0$ frequency in FIG. 4.
Figure 8:
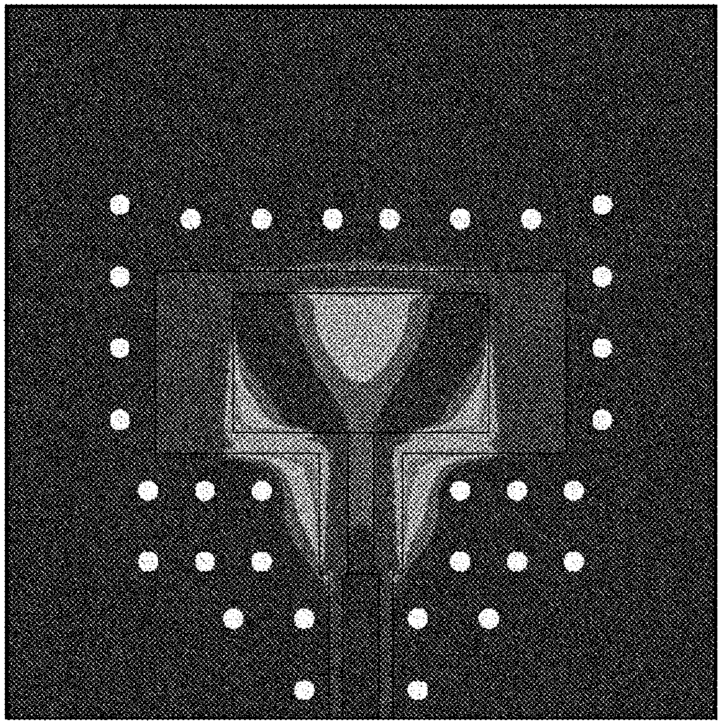
FIG. 8 illustrates an electric field distribution on the substrate at a 1.05 $f_0$ frequency in FIG. 4.

FIG. 7 illustrates an electric field distribution on the substrate 20 at an $f_0$ frequency in FIG. 4. FIG. 8 illustrates an electric field distribution on the substrate 20 at a 1.05 $f_0$ frequency in FIG. 4. By the waveguide converter 10 according to the first embodiment, the higher order mode is formed on the substrate 20, and a resonating point due to the higher order mode contributes to widening the frequency band.

Figure 9:
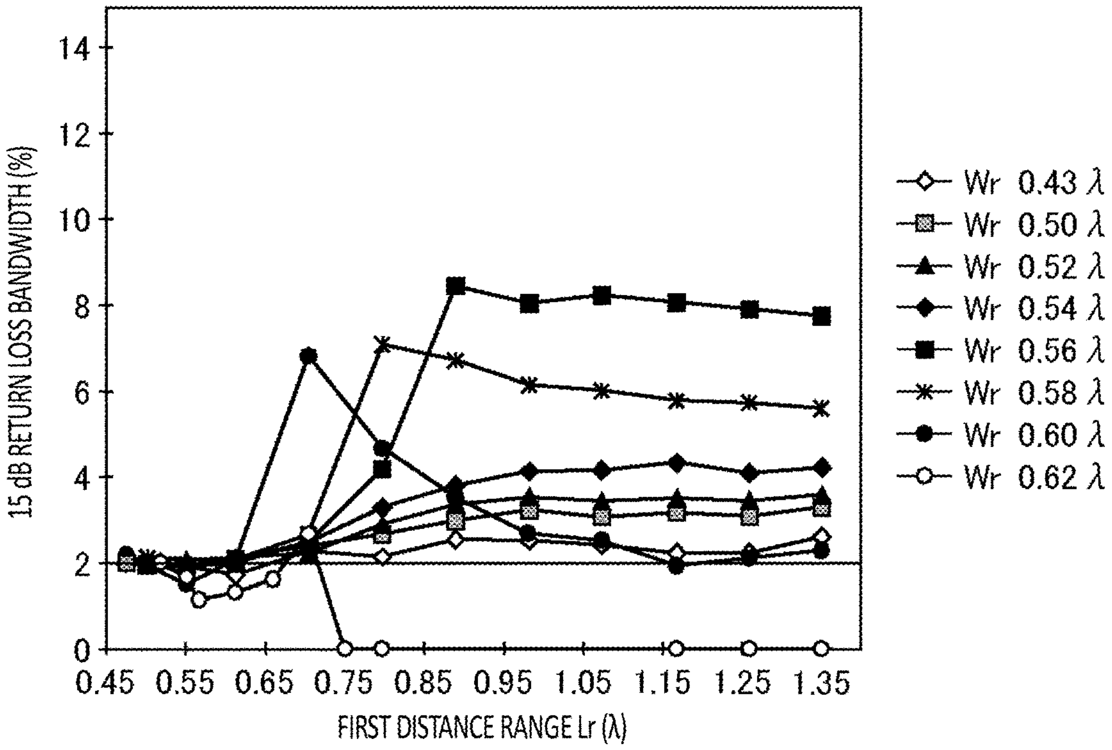
FIG. 9 illustrates a graph of dependency of a bandwidth of 15 dB return loss relative to a minimum distance Wr and a first distance range Lr.
Figure 10:
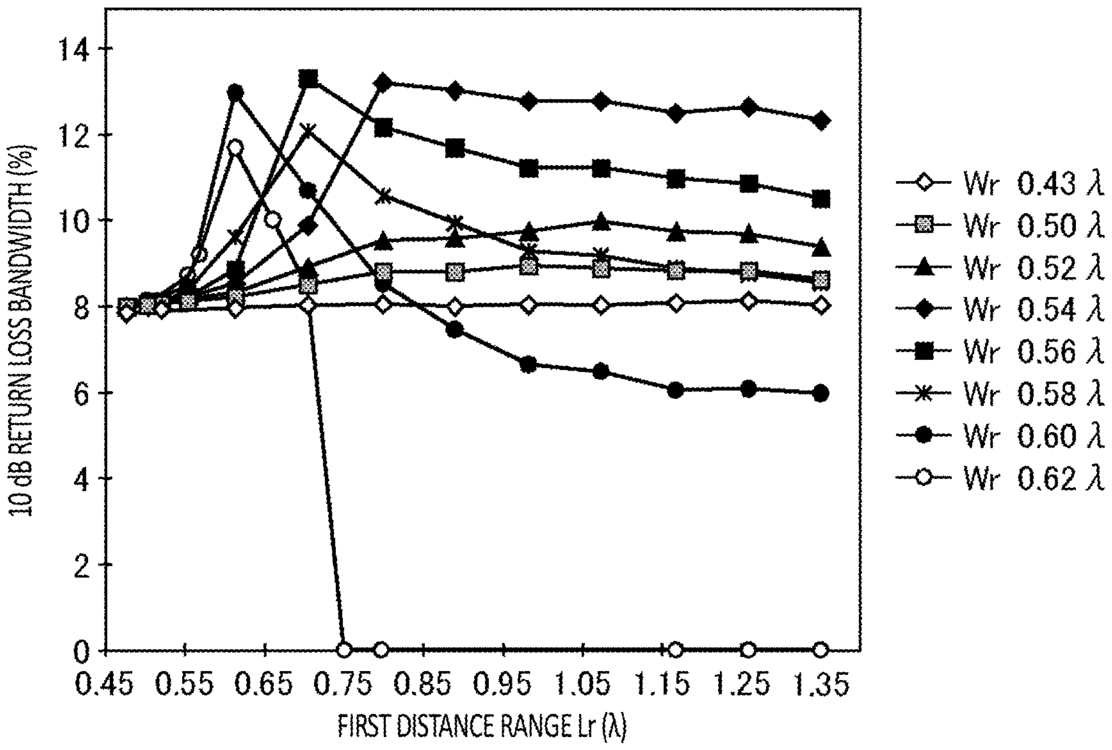
FIG. 10 illustrates a graph of dependency of a bandwidth of 10 dB return loss relative to the minimum distance Wr and the first distance range Lr.

FIG. 9 illustrates a graph of dependency of a bandwidth of 15 dB return loss relative to the minimum distance Wr and the first distance range Lr. FIG. 10 illustrates a graph of dependency of a bandwidth of 10 dB return loss relative to the minimum distance Wr and the first distance range Lr. As can be seen from results shown in FIG. 9 and FIG. 10, depending on the minimum distance Wr between the via-walls of ground vias 54, there is a trade-off between permissible return loss and required bandwidth, and thus it is possible to choose an optimum value based on the application in which it is used.

For example, in order to ensure 2% or more of the 15 dB bandwidth of the reflection amount, it is preferred that the minimum distance Wr between the via-walls of the pair of first ground vias 54 is the distance corresponding to the wavelength from 0.5 wavelength up to 0.6 wavelength relative to the wavelength of the signal transmitting through the transmission line 40. Further, it is preferred that the first distance range Lr is a distance range up to a greater distance than a distance corresponding to at least 0.55 wavelength, or at least 0.65 wavelength.

Similarly, for example, in order to ensure 8% or more of a 10 dB bandwidth of the reflection amount, it is preferred that the minimum distance Wr between the via-walls of the pair of first ground vias 54 is the distance corresponding to the wavelength from 0.5 wavelength up to 0.6 wavelength relative to the wavelength of the signal transmitting through the transmission line 40. Further, it is preferred that the first distance range Lr is the distance range up to the greater distance than the distance corresponding to at least 0.55 wavelength, or at least 0.65 wavelength.

Figure 11:
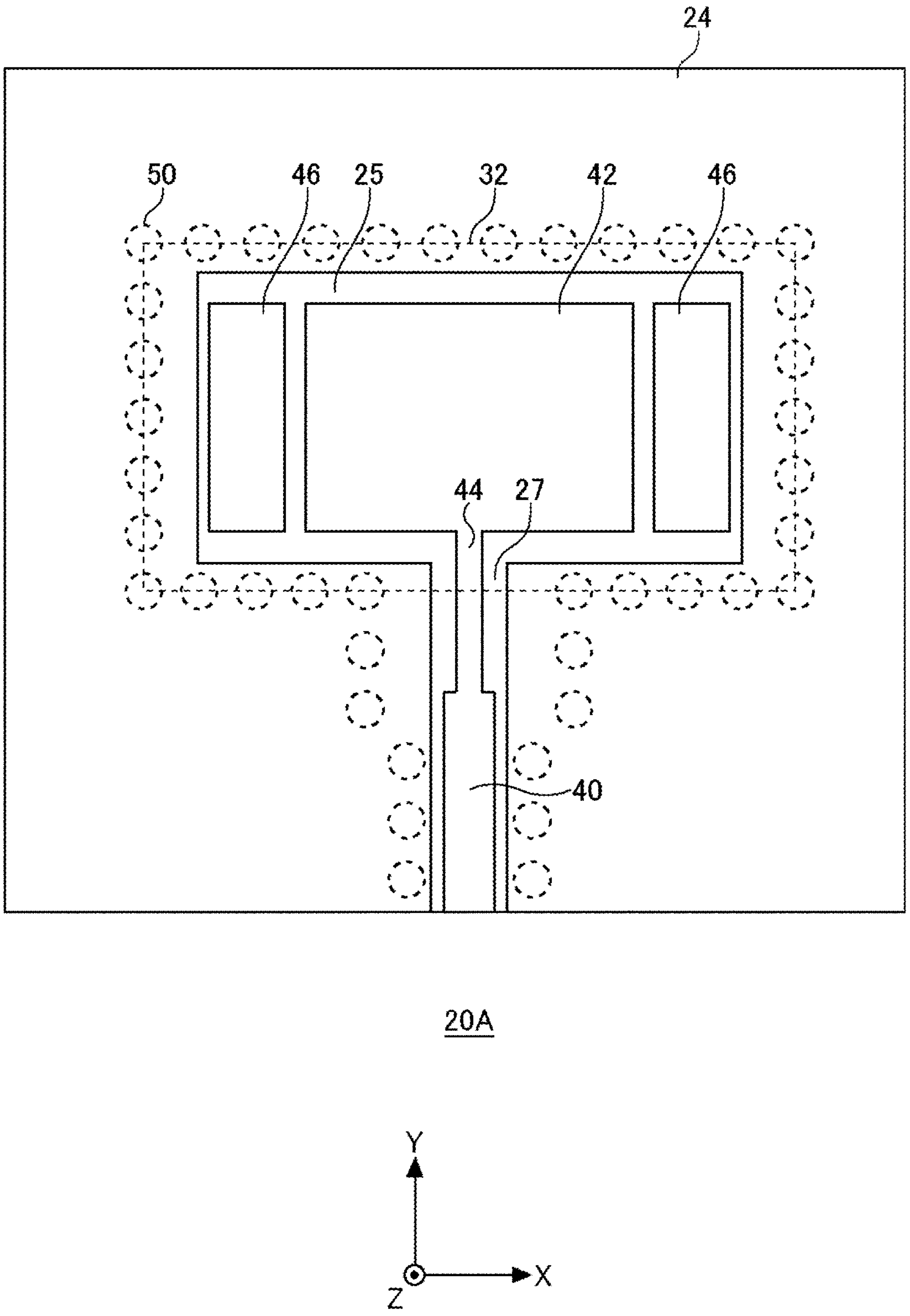
FIG. 11 illustrates a plan view of a substrate included in a waveguide converter according to a second embodiment seen from a first ground conductor layer side.

FIG. 11 illustrates a plan view of a substrate 20A included in a waveguide converter according to a second embodiment. The substrate 20A is different from the substrate 20 in the first embodiment in that it includes, in the second opening 25, a pair of passive elements 46 arranged facing each other on opposite sides of the conductor patch 42 in a direction intersecting with the direction that the transmission line 40 extends i.e., the X-axis direction. By adding a sub-resonating point due to the pair of passive elements 46, a further wider bandwidth of the frequency band can be intended.

Figure 12:
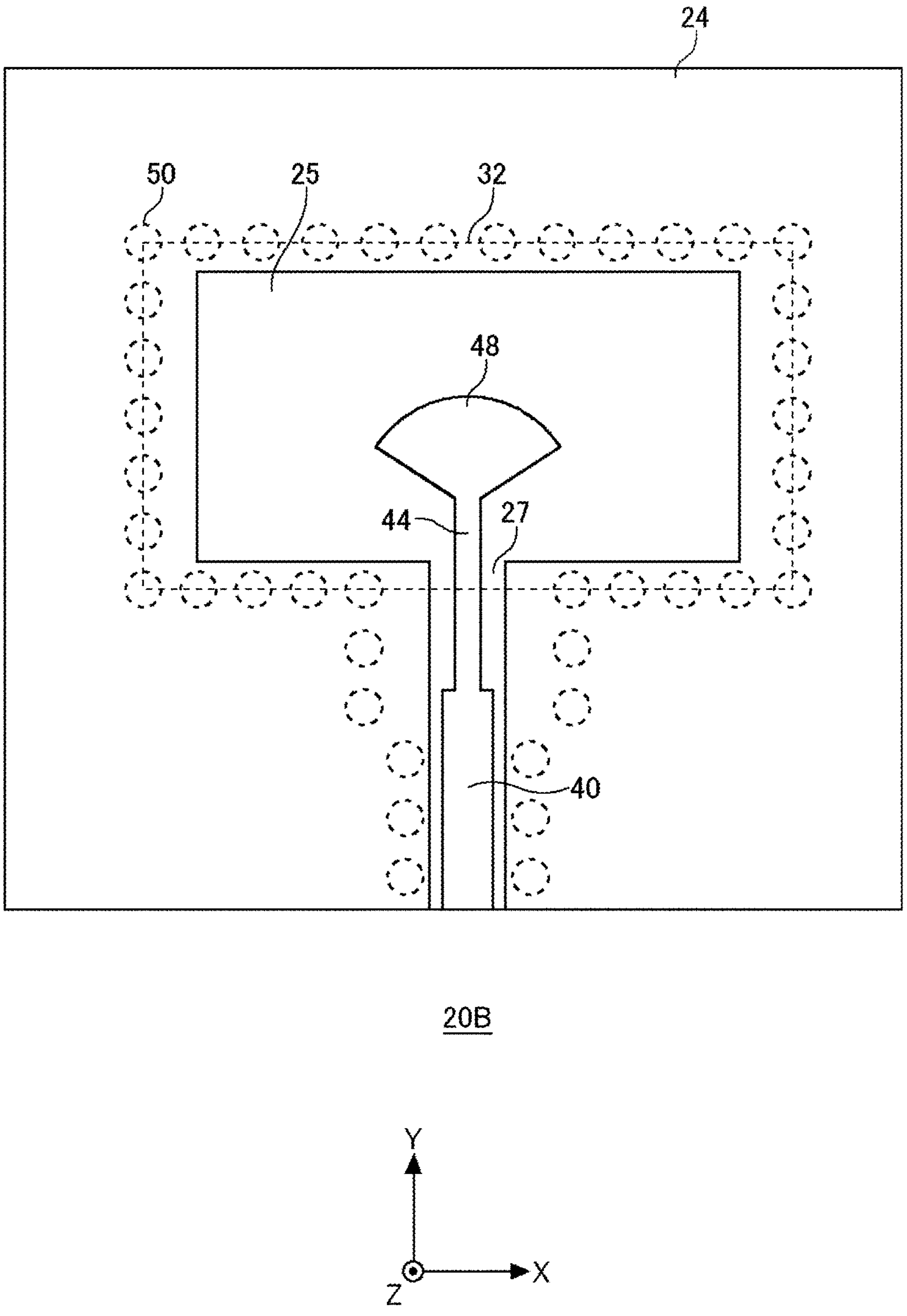
FIG. 12 illustrates a plan view of a substrate included in a waveguide converter according to a third embodiment seen from a first ground conductor layer side.

FIG. 12 illustrates a plan view of a substrate 20B included in a waveguide converter according to a third embodiment.

The substrate 20B is different from the substrate 20 in the first embodiment in that, in a planar view, it includes a conductor patch 48 in a sectorial shape with a central angle from 30 degrees to 160 degrees. By changing a shape of the conductor patch with the sectorial probe shape, a further wider bandwidth of the frequency band can be intended.

The waveguide converter according to each embodiment can achieve, even in a configuration where the waveguide is connected to the signal line side of the transmission line without a need to add a short-circuit waveguide which is expensive and prevents lowering its profile, frequency characteristics with a wide bandwidth with low loss and low cost.

As shown in FIG. 6, in a structure according to the comparative example, because it has the resonating point at TM01 mode only as the resonating point, the frequency bandwidth of 15 dB return loss is about 2%. On the other hand, when a structure according to each embodiment is applied, as shown in FIG. 4, two resonating points can be created at near frequencies, and the bandwidth of 15 dB return loss can be improved up to about 8%. This added resonating point, in addition to TM01 mode in the substrate, which the structure according to the comparative example also has as shown in FIG. 7, occurs by the higher-order mode being created at a resonating portion in the substrate 20 formed due to the ground vias 50, 52 (54, 56) as shown in FIG. 8. This allows two resonating points to be formed in the frequency band, and characteristics with a wide bandwidth and low loss can be achieved. Employing the structure according to each embodiment enables, even in a configuration where the waveguide is connected to the signal line side, the conversion with a wide bandwidth of electrical power of a waveguide/transmission line with low loss to be performed.

Note that while the wider bandwidth in the present embodiment is achieved by creating the two resonating points by adding a resonating structure due to the via-walls, the present invention is not limited to the wider bandwidth achieved by the two resonating points described above, and a further wider bandwidth is possible by adding one or more resonating points, by, in addition to a resonator structure due to the via-walls of the present embodiment, adding a resonating structure due to via-walls similar to those of the present embodiment, which has a resonating point at another frequency, or adding another type of resonator, or the like.

While the present invention has been described with the embodiments, the technical scope of the present invention is not limited to the embodiments described above. It is apparent to persons skilled in the art that various alterations or improvements can be made to the embodiments described above. It is also apparent from the description of the claims that the embodiments to which such alterations or improvements are made may be included in the technical scope of the present invention.

OTHER POSSIBLE ITEMS

Item 1

A waveguide converter comprising:

a substrate; and a waveguide which is arranged on a first surface side of the substrate and includes a cavity portion which extends in a first direction intersecting with the first surface, wherein the substrate includes:

a dielectric layer;

a first ground conductor layer which is arranged on the waveguide side of the dielectric layer, and which includes a second opening which faces a first opening which is one end of the cavity portion of the waveguide, and a slit which extends in a third direction intersecting with a second direction which is a longitudinal direction of the second opening;

a transmission line which is arranged in the slit and extends along the first surface and the slit without contacting the first ground conductor layer;

a conductor patch which is arranged in the second opening without contacting the first ground conductor layer;

a connection line which is arranged in the second opening and the slit along the first surface and connects the transmission line to the conductor patch;

a second ground conductor layer which is arranged on a side of the dielectric layer opposite to the first ground conductor layer; and a plurality of ground vias which are arranged, in a planar view, along an edge of each of the second opening and the slit, and electrically connect the first ground conductor layer to the second ground conductor layer, and the plurality of ground vias include a plurality of pairs of ground vias which are arranged, in a planar view, facing each other on opposite sides of the slit, and the plurality of pairs of ground vias include, in a direction that the slit extends in a planar view from a center of the second opening, at least one pair of first ground vias, which are positioned within a first distance range, and at least one pair of second ground vias, which are positioned within a second distance range which is further away from the center of the second opening than the first distance range, and a minimum distance between via-walls of the at least one pair of first ground vias is wider than a minimum distance between via-walls of the at least one pair of second ground vias, and a signal at a first frequency band is transmitted through the transmission line at a first resonating mode, and a signal at a second frequency band, which is different from the first frequency band, is transmitted through the transmission line at a second resonating mode, which is different from the first resonating mode.

Item 2

The waveguide converter according to item 1, wherein the first distance range is a distance range, in the direction that the slit extends in a planar view, from the center of the second opening up to a greater distance than a distance corresponding to at least 0.55 wavelength relative to a wavelength of the signal transmitting through the transmission line, and the minimum distance between the via-walls of the at least one pair of first ground vias is a distance corresponding to a wavelength from 0.5 wavelength up to 0.6 wavelength relative to the wavelength of the signal.

Item 3

The waveguide converter according to item 2, wherein the first distance range is a distance range, in the direction that the slit extends in a planar view, from the center of the second opening up to a greater distance than a distance corresponding to at least 0.65 wavelength relative to a wavelength of the signal.

Item 4

The waveguide converter according to item 1, a characteristic impedance of the connection line is different from a characteristic impedance of the transmission line.

Item 5

The waveguide converter according to item 4, wherein the characteristic impedance of the connection line is a value between the characteristic impedance of the transmission line and an impedance of the conductor patch.

Item 6

The waveguide converter according to item 1, a width of the connection line is different from a width of the transmission line.

Item 7

The waveguide converter according to item 6, the width of the connection line is narrower than the width of the transmission line.

Item 8

The waveguide converter according to item 1 wherein the substrate further includes, in the second opening, a pair of passive elements arranged facing each other on opposite sides of the conductor patch in a direction intersecting with a direction that the transmission line extends.

Item 9

The waveguide converter according to item 1, wherein, in a planar view, the conductor patch is in a sectorial shape with a central angle from 30 degrees to 160 degrees.

Item 10

The waveguide converter according to item 1, wherein a relative permittivity of the dielectric layer is a value from 2 to 4.

Item 11

The waveguide converter according to item 1, wherein a thickness of the dielectric layer is a value from 0.025 mm to 0.5 mm.

Item 12

The waveguide converter according to item 2 or 3, wherein the first distance range is a distance range, in the direction that the slit extends, from the center of the second opening up to a distance corresponding to 2 wavelength relative to the wavelength of the signal transmitting through the transmission line.

Item 13

The waveguide converter according to item 1, wherein the substrate further includes at least one third conductor layer and at least one other dielectric layer which are arranged on a side of the second ground conductor layer opposite to the dielectric layer and stacked alternately.

It should be noted that the operations, procedures, steps, stages, and the like of each process performed by an apparatus, system, program, and method shown in the claims, the specification, or the drawings can be realized in any order as long as the order is not indicated by "prior to," "before," or the like and as long as the output from a previous process is not used in a later process. Even if the operation flow is described using phrases such as "first" or "next" for convenience in the claims, the specification, or the drawings, it does not necessarily mean that the process must be performed in this order.

EXPLANATION OF REFERENCES

10: waveguide converter; 20, 20A, 20B: substrate; 22: dielectric layer; 24: first ground conductor layer; 25: second opening; 26: second ground conductor layer; 27: slit; 30: waveguide; 32: cavity portion; 33: first opening; 34: notch; 40: transmission line; 42, 48: conductor patch; 44: connection line; 46: passive elements; 50, 52, 54, 56, 58: ground via; 100: waveguide converter; 200: substrate; Wr: minimum distance; Lr: first distance range.

What is claimed is:

1. A waveguide converter comprising:

a substrate; and a waveguide which is arranged on a first surface side of the substrate and includes a cavity portion which extends in a first direction intersecting with the first surface, wherein the substrate includes:

a dielectric layer;

a first ground conductor layer which is arranged on the waveguide side of the dielectric layer, and which includes a second opening which faces a first opening which is one end of the cavity portion of the waveguide, and a slit which extends in a third direction intersecting with a second direction which is a longitudinal direction of the second opening;

a transmission line which is arranged in the slit and extends along the first surface and the slit without contacting the first ground conductor layer;

a conductor patch which is arranged in the second opening without contacting the first ground conductor layer;

a connection line which is arranged in the second opening and the slit along the first surface and connects the transmission line to the conductor patch;

a second ground conductor layer which is arranged on a side of the dielectric layer opposite to the first ground conductor layer; and a plurality of ground vias which are arranged, in a planar view, along an edge of each of the second opening and the slit, and electrically connect the first ground conductor layer to the second ground conductor layer, and the plurality of ground vias include a plurality of pairs of ground vias which are arranged, in a planar view, facing each other on opposite sides of the slit, and the plurality of pairs of ground vias include, in a direction that the slit extends in a planar view from a center of the second opening, at least one pair of first ground vias, which are positioned within a first distance range, and at least one pair of second ground vias, which are positioned within a second distance range which is further away from the center of the second opening than the first distance range, and a minimum distance between via-walls of the at least one pair of first ground vias is wider than a minimum distance between via-walls of the at least one pair of second ground vias, and a signal at a first frequency band is transmitted through the transmission line at a first resonating mode, and a signal at a second frequency band, which is different from the first frequency band, is transmitted through the transmission line at a second resonating mode, which is different from the first resonating mode.

2. The waveguide converter according to claim 1, wherein the first distance range is a distance range, in the direction that the slit extends in a planar view, from the center of the second opening up to a greater distance than a distance corresponding to at least 0.55 wavelength relative to a wavelength of the signal transmitting through the transmission line, and the minimum distance between the via-walls of the at least one pair of first ground vias is a distance corresponding to a wavelength from 0.5 wavelength up to 0.6 wavelength relative to the wavelength of the signal.

3. The waveguide converter according to claim 2, wherein the first distance range is a distance range, in the direction that the slit extends in a planar view, from the center of the second opening up to a greater distance than a distance corresponding to at least 0.65 wavelength relative to a wavelength of the signal.

4. The waveguide converter according to claim 3, wherein the first distance range is a distance range, in the direction that the slit extends, from the center of the second opening up to a distance corresponding to 2 wavelength relative to the wavelength of the signal transmitting through the transmission line.

5. The waveguide converter according to claim 2, wherein the first distance range is a distance range, in the direction that the slit extends, from the center of the second opening up to a distance corresponding to 2 wavelength relative to the wavelength of the signal transmitting through the transmission line.

6. The waveguide converter according to claim 1, wherein a characteristic impedance of the connection line is different from a characteristic impedance of the transmission line.

7. The waveguide converter according to claim 6, wherein the characteristic impedance of the connection line is a value between the characteristic impedance of the transmission line and an impedance of the conductor patch.

8. The waveguide converter according to claim 1, a width of the connection line is different from a width of the transmission line.

9. The waveguide converter according to claim 8, the width of the connection line is narrower than the width of the transmission line.

10. The waveguide converter according to claim 1 wherein the substrate further includes, in the second opening, a pair of passive elements arranged facing each other on opposite sides of the conductor patch in a direction intersecting with a direction that the transmission line extends.

11. The waveguide converter according to claim 1, wherein, in a planar view, the conductor patch is in a sectorial shape with a central angle from 30 degrees to 160 degrees.

12. The waveguide converter according to claim 1, wherein a relative permittivity of the dielectric layer is a value from 2 to 4.

13. The waveguide converter according to claim 1, wherein a thickness of the dielectric layer is a value from 0.025 mm to 0.5 mm.

14. The waveguide converter according to claim 1, wherein the substrate further includes at least one third conductor layer and at least one other dielectric layer which are arranged on a side of the second ground conductor layer opposite to the dielectric layer and stacked alternately.

* * * * *